United States Patent [19]

Fuentes

[11] Patent Number: 5,353,333
[45] Date of Patent: Oct. 4, 1994

[54] SMALL WIRELESS TELECOMMUNICATIONS SYSTEM

[75] Inventor: James J. Fuentes, South Barrington, Ill.

[73] Assignee: AT&T Bell Laboratories, Murray Hill, N.J.

[21] Appl. No.: 998,311

[22] Filed: Dec. 30, 1992

[51] Int. Cl.$^5$ .................................. H04M 11/00
[52] U.S. Cl. ........................ 379/59; 455/33.1; 455/56.1
[58] Field of Search .................. 379/58, 59; 455/15, 455/16, 33.1, 56.1

[56] References Cited

U.S. PATENT DOCUMENTS

| | | | |
|---|---|---|---|
| 3,764,915 | 10/1973 | Cox et al. | 455/33.1 |
| 4,242,538 | 12/1980 | Ito et al. | |
| 4,599,490 | 7/1986 | Cornell et al. | |
| 4,759,051 | 7/1988 | Han | 379/59 |
| 4,827,499 | 5/1989 | Warty et al. | |

OTHER PUBLICATIONS

European Transactions on Telecommunications and Related Technology article, "Digital Cellular Mobile-Radio System ECR900", by Ballard et al., pp. 17-30, Jan.-Feb. 1990.
"Ultraphone 100 Wireless Digital Loop Carrier", System Description, International Mobile Machines Corporation, 1987, pp. 1.1-5.3.

*Primary Examiner*—Curtis Kuntz
*Assistant Examiner*—Dwayne D. Bost
*Attorney, Agent, or Firm*—Werner Ulrich

[57] ABSTRACT

This invention relates to a method and apparatus for offering wireless telecommunication service. Pairs of the transceivers of a wireless cell site are directly interconnected. When a request for service is received, a controller allocates a pair of the transceivers to handle the call. If the call is to the public switched telephone network, an unconnected transceiver is connected to a switching system, such as a toll switch, and a protocol converter converts between call control messages to and from the cell site and call control messages to and from the toll switch. If the cell site has directional antennas, a pair of transceivers connected to the directional antennas for serving the calling and called stations is selected; transceivers connected to an omni-directional antenna can be used for overflow traffic and for traffic between the toll office and the cell site. Advantageously, the need for switching is avoided by selecting appropriate transceiver pairs and tuning the mobile stations to the correct channels.

9 Claims, 4 Drawing Sheets

WIRELESS TERMINATED CALL

SMALL WIRELESS TELECOMMUNICATIONS SYSTEM

CROSS-REFERENCE TO RELATED APPLICATION

This application relates to an application by James J. Fuentes entitled "Architecture For A Wireless Telecommunication System", filed Aug. 11, 1992, Ser. No. 928,386, and assigned to the same assignee as this application.

TECHNICAL FIELD

This invention relates to wireless telecommunications systems, and more specifically, to the architecture of a relatively small system for handling traffic that is largely intra-cell-site.

Problem

Wireless telecommunication networks have grown very rapidly in the past decade as a result of substantial breakthroughs in the cost of wireless telecommunication terminals, otherwise known as mobile stations. Such "mobile stations" exist in many forms from those which are mounted in automobiles to portable stations to hand held stations, to fixedly mounted stations. The cellular principle has permitted a large growth in the amount of wireless telecommunications which can be carried over the allocated radio spectrum thus allowing a huge growth in the number of wireless telecommunication subscribers.

While major cost breakthroughs have taken place in the customer equipment (the radio transceivers for communicating with the cellular systems), a similar cost breakthrough has not taken place in the central office equipment required to establish connections between customer stations. In particular, while large systems have been designed whose per subscriber cost is not high, small and inexpensive switching systems are not available in the prior art.

Solution

The above problem is solved and an advance is made over the prior art in accordance with this invention wherein ones of the transceivers of a cell site are directly connected to another transceiver so that the customers served by the transceivers at each end of the connection of these transceivers can communicate. In accordance with one aspect of the invention, others of the transceivers are connected to a switching system such as a toll office via a group of communication channels. The cell site is connected by a data link to a combination protocol converter/processor (PCP). The PCP converts between messages to the toll office and comparable control messages to the base station. The PCP receives the dialed number from the caller, has information relating each directory number served by the cell site to a particular directional antenna if the cell site is equipped with such antennas, and on the basis of the identification of the caller and called customer for an intra-cell-site call, selects a pair of transceivers, one of which is connected to each of the directional antennas serving the calling and called customers which radios can then be used for the conversation. If the call is incoming from the toll office or outgoing to the toll office, the controller selects a transceiver for serving the customer who is served by the cell site and informs the toll office of which communication channel to use.

In one specific embodiment of the invention, some of the transceivers are connected to omni-directional antenna and can be used effectively as an overflow group for calls in which no radio pairs are available for the appropriate antenna faces for calling and called customers on an intra-cell-site call, or no appropriate radio is available for serving the customer served by the cell site on an incoming or outgoing call. In another specific embodiment, all the transceivers are connected to an omni-directional antenna; advantageously, blockage, because of absence of a pair of connected transceivers between specific directional antennas, is avoided.

DETAILED DESCRIPTION

Figure 1:
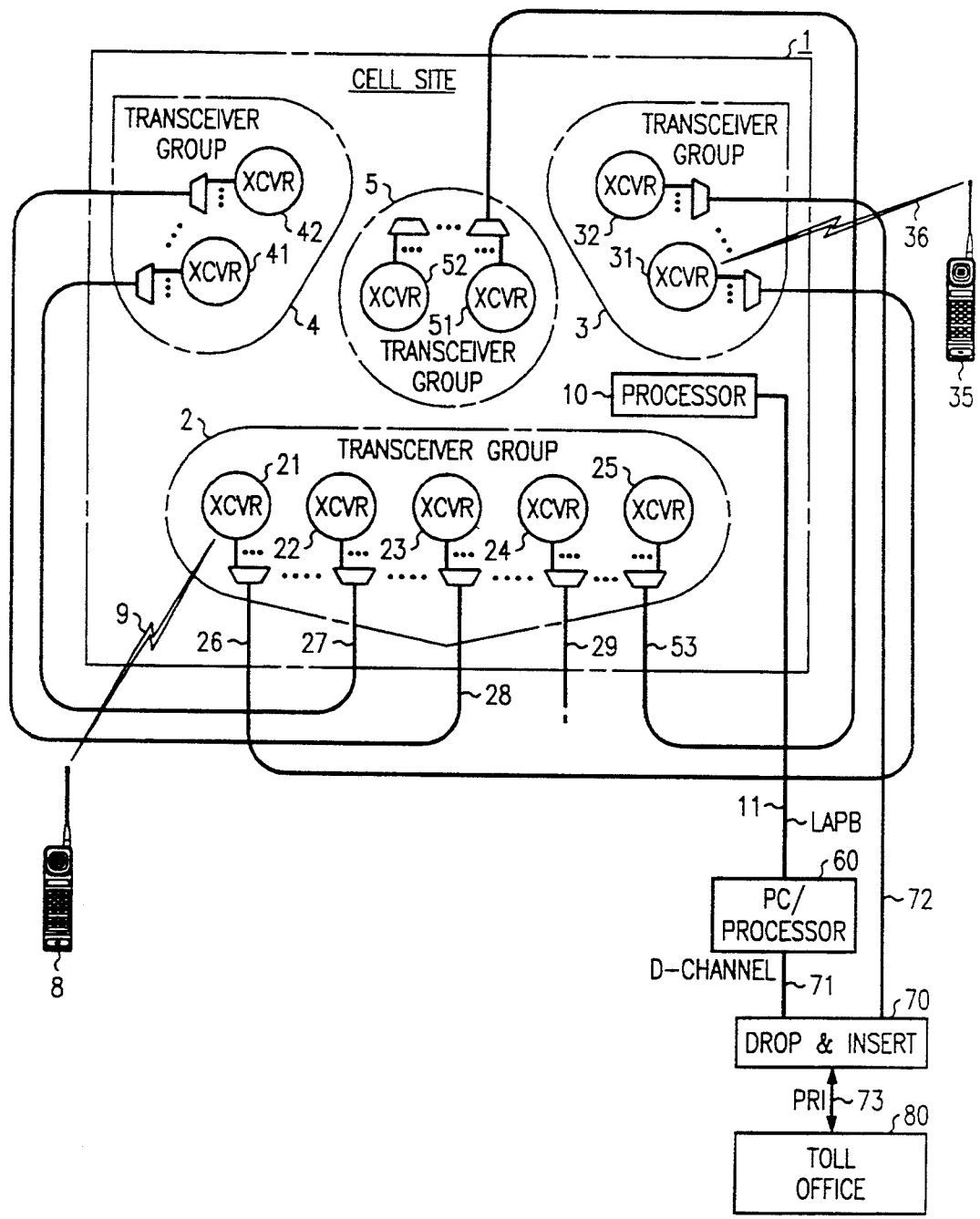
FIG. 1 is a block diagram illustrating the operation of the invention.

FIG. 1 is a block diagram illustrating the operation of applicant's invention. A radio cell site 1 communicates with mobile stations such as mobile station 8 and 35. A cell site such as the Autoplex ® Series I Mod II Cell Site, manufactured by AT&T, can be used in this application. A different cell site can be used if the European Global Systems for Mobile Communication (GSM) standard protocol is required. This cell site operates in essentially the same manner as a cell site connected to a mobile switching system. The cell site is under the control of a processor 10 and includes four groups of transceivers, groups 2, 3, 4, and 5. Each of the transceivers in groups 2, 3, and 4 are connected to one of the three directional antennas of the cell site. The radios in group 5 are connected to an omnidirectional antenna of the cell site.

In accordance with the teachings of applicant's invention, the transceivers of the cell site are interconnected by wire connections. For example, radio 21 of group 2 is connected through wired connection 26 to radio 31 of group 3, radio 22 of group 2 is connected through wire connection 27 to radio 41 of group 4; radio 24 of group 2 is connected through wire connection 29 to a multiplexer 70 for connection to toll office 80 to access the area outside the area covered by cell site 1; and radio 25 is connected through wire connection 53 to radio 51 of group 5. In the preferred embodiment, the connections are via multi-channel carrier links so that a group of 24 transceivers of one transceiver group is connected to a group of 24 transceivers of the same or different transceiver groups. However, it is also possible to use cell sites whose outputs are individual channels and simply interconnect the individual channels rather than the multiplexers.

The processor 10 used for controlling cell site 1 is connected by a data link 11 to a protocol converter/processor (PCP) 60. An NCR Star Server E (Intel 486) based computer manufactured by NCR, Inc., can be used as the PCP; in the preferred embodiment, the computer is equipped with an interface board such as a DPLI/HDLC Controller Board for UNIX ® systems to terminate the two data links to the PC. The PCP controls the establishment of wireless connections by selecting properly interconnected ones of the transceivers of cell site 1 for connection to the calling and called wireless stations and directing the processor 10 to establish connections between these transceivers and the wireless stations. For example, if wireless station 8 signals a request to be connected to wireless station 35. PCP 60 can select the use of transceiver 21 by a radio channel to mobile station 8 and transceiver 31 for connection by a radio channel 36 to mobile station 35, knowing that transceivers 21 and 31 are connected by wire connection 26 and therefore knowing that if these two radio channels are established, mobile stations 8 and 35 will be able to communicate. Processor 10 signals the request received from mobile station 8 for a connection and PCP 60 analyzes the called directory number, recognizes that this directory number is for mobile station 35, which can communicate via the radios of group 3, and therefore selects a pair of radios from group 2 and group 3 that are interconnected by a wire connection.

If all of the available radios in cell group 3 accessible by available radios in cell group 2 are busy, then a radio of cell group 2, such as radio 25, can be used; this radio is connected to radio 51 in radio group 5, the radios of that group being connected to an omnidirectional antenna capable of reaching any mobile station. In effect, the radios of group 5 are used for overflow traffic when no directly connected radios of the primary groups are available.

In order to access the outside world, some of the transceivers, such as transceiver 32, are connected to a switching system such as toll office 80. In the preferred embodiment, this connection is via a digital carrier system using a U.S. standard T1 signal. The transceivers are connected by this T1 signal carrier over connection 72 to a drop and insert unit 70 whose output is an integrated services digital network (ISDN) primary rate interface (PRI) signal 71. The drop and insert unit is used to substitute a D-channel for one of the 24 T carrier channels. The drop and insert unit can be implemented using a Crossnet 442 multiplexer manufactured by Tellabs. The D-channel of this primary rate interface signal is provided by and provides signals to PCP 60. PRI 71 is connected to toll office 80 in a well known manner. For a connection, for example, from wireless station 35 to the outside world via toll office 80, the request is signaled from processor 10. The signal is received over the dam link 11 in the LAPB format of the international standard X.25 signal produced by processor 10 and is converted in PCP 60 into a D-channel signal for transmission via D-channel 71 to drop and insert unit 70, thence over the PRI link 73 to toll office 80. The actual talking connection can be established using transceiver 32 which can receive signals from wireless station 35 and is connected by connection 72 to drop and insert unit 70. For application outside North America and Japan, the appropriate 32 channel carrier system can be used.

Figure 2:
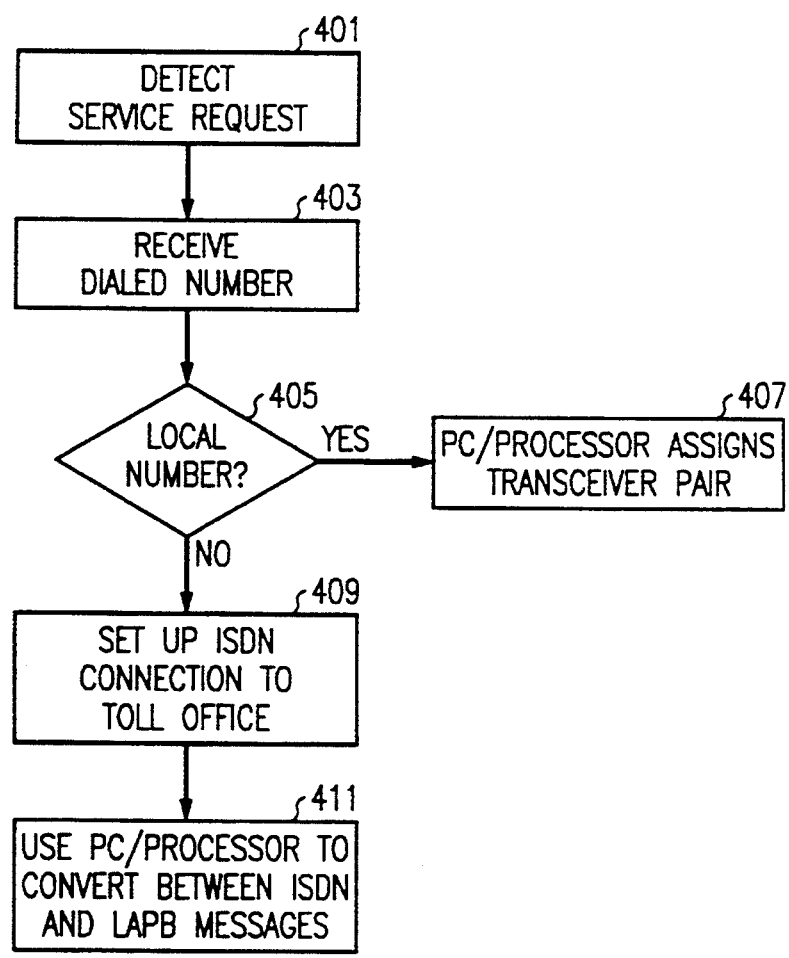
FIG. 2 is a flow diagram illustrating the method of processing intra-cell-site traffic.

FIG. 2 is a flow diagram of the processing of calls in the preferred embodiment. A service request is detected in the cell site (action block 401). The cell site receives the dialed number from the caller (action block 403). This number is transmitted to PCP 60 which checks whether the number is a local number (i.e., a number served from the cell site) or a number for accessing the public switched network. If it is a local number, then the PCP assigns a transceiver pair for communicating with the calling and called wireless stations (action block 407). If the number is not a local number, then an ISDN connection is set up to toll office 80. A toll office is used in the preferred embodiment since, in many cases, the cell site will be at some relatively isolated location; however, a class 5 switch end office can also be used. The requirement is that in accordance with the arrangements for communicating under the teachings of the present invention, either the toll office or class 5 switch must be adapted to serve ISDN traffic. The PCP is then used to convert between ISDN messages used by the toll office and LAPB messages used by the cell site (action block 411). Details of the communications with the toll office for both outgoing and incoming calls are presented in the discussion of FIGS. 3 and 4.

The assignment of a transceiver pair carried out in block 407 is one which must take into account the antennas serving the caller and called stations. If all are served only from omni-directional antennas then an arbitrary connected transceiver pair can be used. Otherwise, a transceiver pair, one of whose members is connected to the antenna serving the caller and the other of whose members is connected to an antenna serving the called station is required. The omni-directional antenna can serve all customers and so this antenna can be useful for handling various types of overflow traffic. It can handle traffic from the directional antenna of the caller, it can handle traffic from the directional antenna of the called customer and, of course, intra-omni-directional traffic can access any pair of stations.

Figure 3:
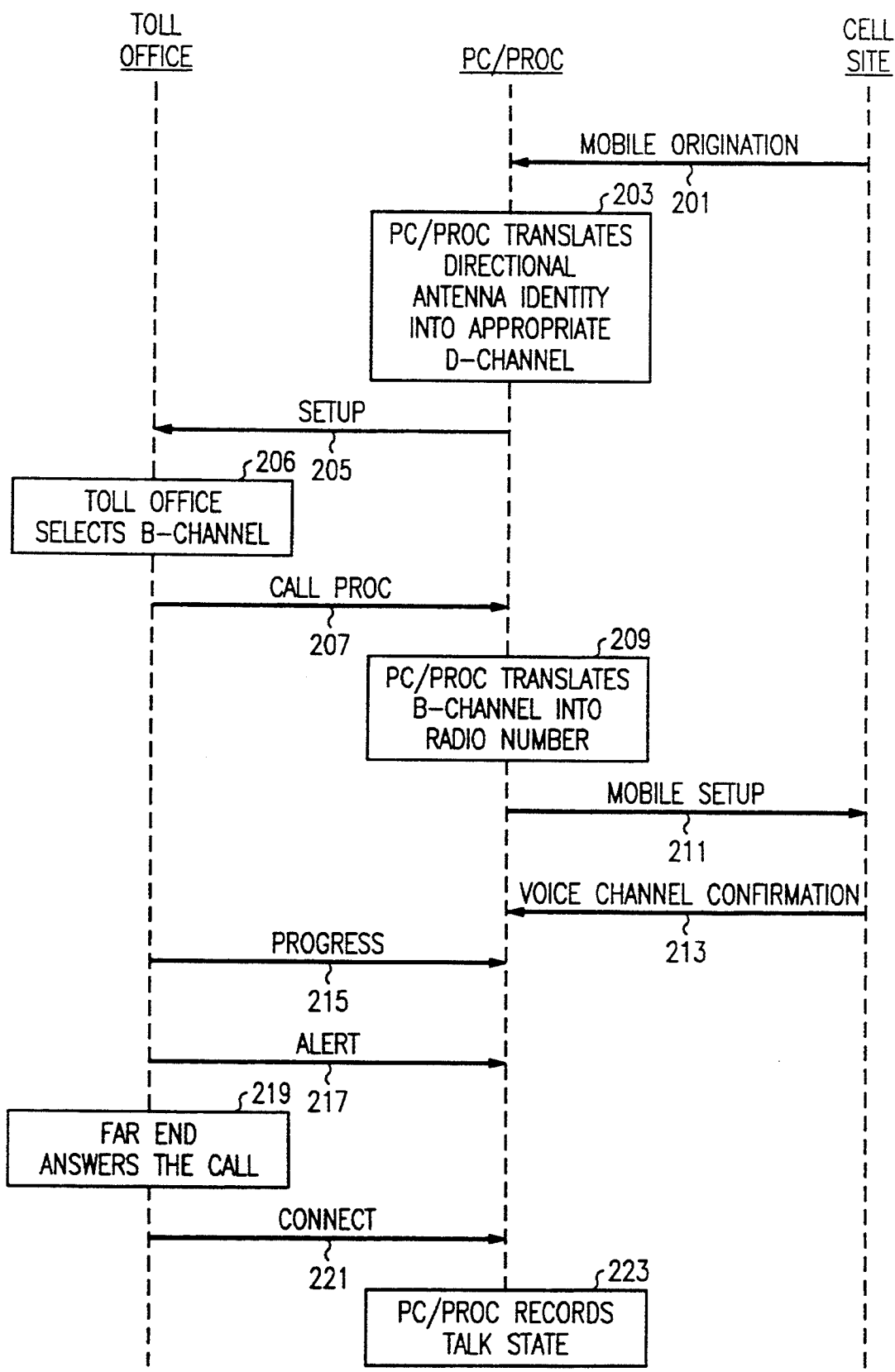
FIGS. 3 and 4 are flow diagrams illustrating the methods of processing outgoing and incoming traffic.
Figure 4:
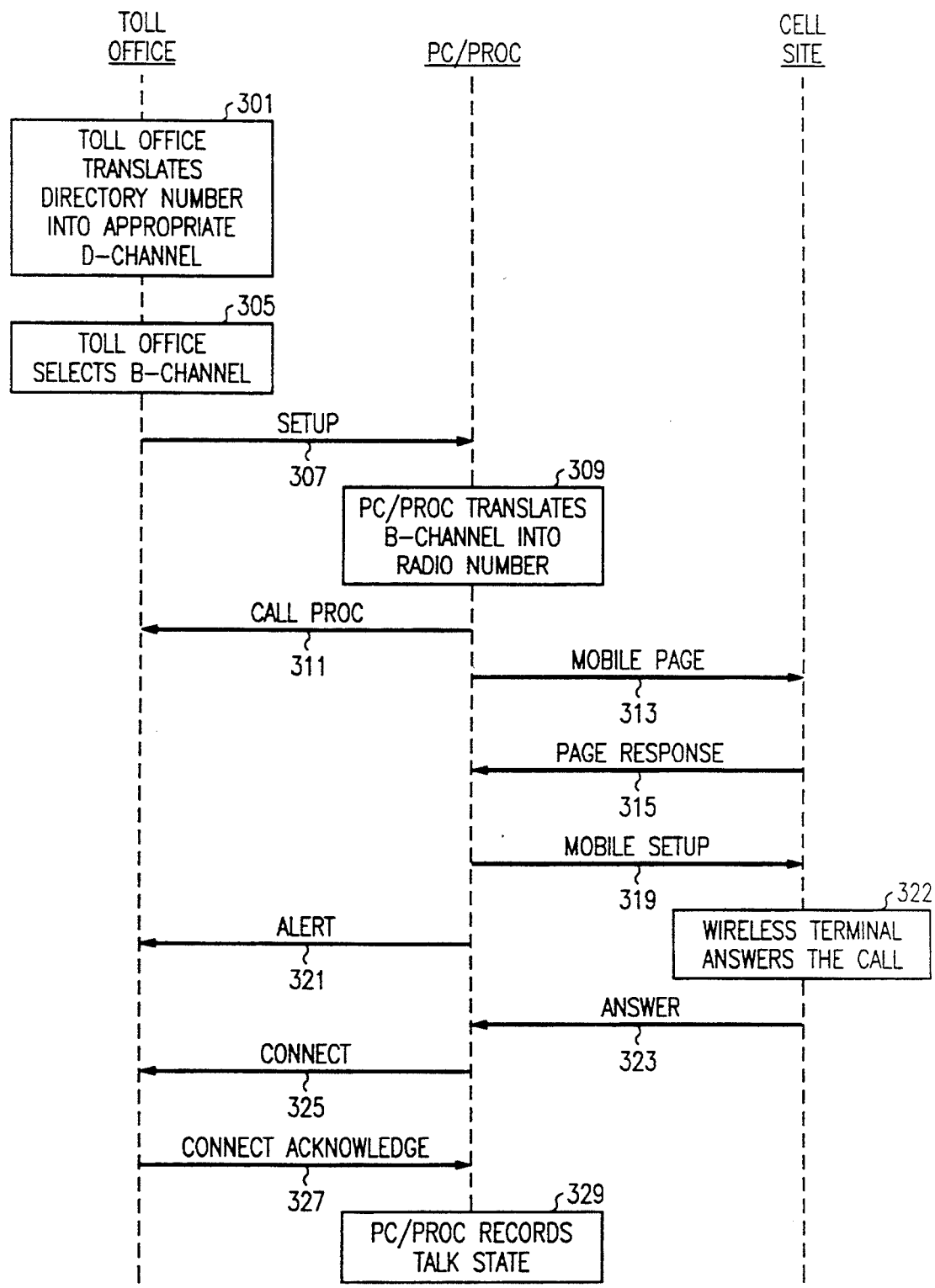

The following discussions of FIGS. 3 and 4 describe how the PCP is used in conjunction with calls to and from a toll office 80. The PCP converts between ISDN control messages specified in the CCITT Q.931 message set and a message set, in this example, transmitted over link layer LAPB of the X.25 protocol, for communicating with a cell site. Calls connected to the toll office may be either incoming from the public switched network or outgoing to the public switched network in contrast to the intra-cell-site calls described in blocks 401–407 of FIG. 2.

FIG. 3 illustrates the messages and the actions performed by PCP 60 in setting up a wireless originated call to the public switched network via toll office 80. The cell site 1 receives an indication from the mobile station 1 that the mobile station wishes to originate and receives the number of the called customer divided by the originating mobile station. Cell site 1 sends message 201 to PCP 60, the message containing an identification of the calling main station, the called number, and an indication of which directional antenna is optimum for use on this call. The mobile station picks the set-up channel that corresponds to the optimum directional antenna. The PCP 60 translates the directional antenna identity into the appropriate D-channel 71 for use in communicating with the toll office 80. If one D-channel serves all of the PRIs connecting the toll office to the cell site, this translation is not required. The PCP then transmits a set-up message 205, including the called directory number and an identity of the caller, to toll office 80. As shown in action box 206 toll office 80 then selects a B-channel appropriate for use with the identified directional antenna and transmits over D-channel 71 a call proceed message 207 identifying the selected B-channel. In action block 209, PCP 60 translates the B-channel identity into a radio transceiver number and transmits a mobile set-up message 211 to the cell site to establish communication between the selected B-channel and the mobile station 35. The cell site 1 having confirmed the establishment of such a radio communication then returns to the PCP 60 a voice channel confirmation message 213.

In the meantime, toll office 80 has been establishing the other end of the connection and transmits a series of call progress messages 215 to PCP 60 which maintains track of the status of the connection. When the connection has been established, an alert message 217 is sent from toll office 80 to PCP 60 indicating that the called customer is being alerted. The calling customer hears audible tone. The toll office 80 then detects that the call has been answered (action block 219) and transmits a connect message 221 to the PCP 60. In response, the PCP 60 records that the connection is now in the talk state (action block 223).

FIG. 4 illustrates a wireless terminated call. Action block 301 indicates that the toll office 80 has received an incoming call. (If the cell site is connected to an end office (class 5), this may also be an originating call; also, if the toll office is accessed via a local by-pass connection, this may also be an originating call.) The toll office translates the directory number into the appropriate D-channel for use in communicating with the PCP (action block 303). The toll office then selects a B-channel to be used for this conversation (action block 305). In this embodiment, each PRI can serve only one cell site sector or the omni-directional antenna, but several PRIs may serve one sector. The toll office then sends a set-up message including the identity of the called main station and the identity of the B-channel to be used for the connection (message 307). The PCP 60 translates this B-channel number into a radio transceiver number (action block 309) and transmits, in response, a call process proceeding message 311 back to the toll office. The PCP 60 then transmits a request to page the mobile via message 313 transmitted over data channel 11 to cell site 1. Cell site 1 pages the mobile and if the mobile responds properly, transmits a page response message 315 back to PCP 60. The PCP then sends a mobile set-up message 319 to the cell site requesting that the connection between the selected B-channel and the mobile station be established and that the connection be monitored to determine whether the called mobile station answers the call. The PCP also sends an alert message back to the toll office, adapted to transmit audible tone, to indicate that the calling party should receive audible ringing tone. Alternatively, a unit such as the AT&T Uniprism ™ card, if used as a drop and insert unit, can apply audible tone directly to any of the PRI channels. When the wireless terminal answers the call (action block 322) an answer message 323 is sent from the cell site to the PCP. The PCP passes on a connect message 325 to request that the toll office complete the connection to the called customer and remove the audible ringing tone connection. After completing this task, the toll office returns a connect acknowledge message 327 to the PCP and the PCP records the talking state for that connection (action block 329).

Clearly, the use of an omni-directional antenna, capable of reaching all mobile stations served by the cell site is advantageous, since it avoids splintering the groups of locally connected transceivers, and the groups of transceivers for communicating with the toll switch. Directional antennas should only be used where there is a necessity of conserving radio frequency spectrum space. The omni-directional antenna is particularly useful for serving traffic to and from the toll switch, since the small trunk groups for such communications should not be further splintered.

While this example shows the use of a toll switch, a private branch exchange, or a local switch can also be used. The only requirement is that the switch be equipped to communicate with the cell site using a protocol that can be directly used by the cell site or convened by a protocol converter. This type of arrangement can also be used for microcells, wherein one cell site controls several antennas; the disclosure above with respect to directional antennas applies also to such arrangements, because different antennas are preferred for use with different mobile stations. The principles of this invention are especially applicable to Personal Communication Systems (PCSs) because of the low cost of systems built accordingly.

It is to be understood that the above description is only of one preferred embodiment of the invention. Numerous other arrangements may be devised by one skilled in the art without departing from the scope of the invention. The invention is thus limited only as defined in the accompanying claims.

Claims:

1. A wireless switching system comprising:
 a wireless cell site, for serving a plurality of wireless stations, said wireless cell site comprising a first plurality of wireless transceivers;
 a plurality of predisposed switchless connections, each wireless transceiver of said first plurality of wireless transceivers includes a single predisposed switchless connection, of said plurality of predisposed switchless connections, with one other wireless transceiver resulting in a directly connected pair of transceivers; and
 control means, responsive to receipt of a first telephone number supplied by a first wireless calling station served by said wireless cell site, for assigning a connected pair of said first plurality of wireless transceivers of said wireless cell site to said first wireless calling station and to a first wireless called station, said first called station served by said wireless cell site and identified by said first telephone number, for connecting said first calling and first called stations.

2. The system of claim 1 wherein said wireless cell site comprises a plurality of directional antennas, wherein said first plurality of wireless transceivers comprises a plurality of groups of wireless transceivers, each group being connected to a different directional antenna, and wherein said plurality of predisposed switchless connections connects pairs of wireless transceivers of the same and of different ones of said plurality of groups.

3. The system of claim 1:
 wherein said wireless cell site comprises a plurality of directional antennas, and an omni-directional antenna;
 wherein said first plurality of wireless transceivers comprises a plurality of groups of transceivers, all members of each group being connected to one of said directional antennas or to said omni-directional antenna; and
 wherein said plurality of predisposed switchless connections connects pairs of wireless transceivers of the same and of different ones of said plurality of groups.

4. The system of claim 1 wherein said wireless cell site comprises an omni-directional antenna connected to said first plurality of wireless transceivers.

5. The system of claim 1 further comprising:

a second plurality of wireless transceivers connected to a land-based switching system;

said control means, responsive to receipt of a second telephone number from a second wireless calling station served by said wireless cell site, said second telephone number assigned to a station that is not a wireless station served by said wireless cell site, for assigning said second wireless calling station to one of said second plurality of wireless transceivers.

6. The system of claim 5 wherein said control means is further responsive to receipt of a third telephone number, said third telephone number being a number assigned to a second wireless called station served by said wireless cell site, from said land-based switching system for assigning one of said second plurality of wireless transceivers to said second called station.

7. The system of claim 6 wherein said wireless cell site comprises an omni-directional antenna connected to said second plurality of wireless transceivers.

8. The system of claim 6 further comprising:

protocol conversion means for converting between a signaling protocol of said wireless cell site for signaling to a mobile switching center and a signaling protocol for communicating between said protocol conversion means and said land-based switching system.

9. The system of claim 8 wherein said protocol conversion means communicates with said land-based switching system using an integrated services digital network (ISDN) protocol.

* * * * *